United States Patent
Moromizato et al.

(10) Patent No.: US 7,480,158 B2
(45) Date of Patent: Jan. 20, 2009

(54) SYNCHRONOUS RECTIFYING FORWARD CONVERTER

(75) Inventors: Eito Moromizato, Nagaokakyo (JP); Tadahiko Matsumoto, Otsu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/848,927

(22) Filed: Aug. 31, 2007

(65) Prior Publication Data

US 2008/0049456 A1 Feb. 28, 2008

Related U.S. Application Data

(63) Continuation of application No. PCT/JP2006/317626, filed on Sep. 6, 2006.

(30) Foreign Application Priority Data

Oct. 19, 2005 (JP) .............................. 2005-304763

(51) Int. Cl.
*H02M 3/335* (2006.01)
(52) U.S. Cl. ................... 363/21.06; 363/21.04
(58) Field of Classification Search ................... 363/20, 363/21.01, 21.04, 21.06, 21.08, 21.14, 21.16
See application file for complete search history.

(56) References Cited

U.S. PATENT DOCUMENTS

| | | | | |
|---|---|---|---|---|
| 5,734,563 A * | 3/1998 | Shinada | ..................... | 363/21.06 |
| 6,064,580 A * | 5/2000 | Watanabe et al. | ............. | 363/17 |
| 6,711,039 B2 * | 3/2004 | Brkovic | ...................... | 363/127 |
| 6,940,732 B2 * | 9/2005 | Tobita | ..................... | 363/21.06 |
| 6,995,991 B1 * | 2/2006 | Yang et al. | ............... | 363/21.14 |
| 7,196,920 B2 * | 3/2007 | Quitayen | .................... | 363/127 |
| 7,304,868 B2 * | 12/2007 | Aso et al. | ............... | 363/21.06 |

FOREIGN PATENT DOCUMENTS

| | | |
|---|---|---|
| JP | 11-206118 | 7/1999 |
| JP | 2004-208407 | 7/2004 |
| JP | 2004-215417 | 7/2004 |
| JP | 2005-012919 | 1/2005 |

OTHER PUBLICATIONS

Written Opinion.
International Search Report issued Dec. 5, 2006.

* cited by examiner

*Primary Examiner*—Matthew V Nguyen
(74) *Attorney, Agent, or Firm*—Ostrolenk, Faber, Gerb & Soffen, LLP

(57) ABSTRACT

A first drive control signal regenerating circuit outputs an ON timing drive signal at turn-ON of a main switch element, and a second drive control signal regenerating circuit generates an OFF timing drive signal at turn-OFF of the main switch element. A rectifying switch controlling switch element connected between the gate and source of a rectifying switch element is driven by an output of the second drive control signal regenerating circuit. An output of the first drive control signal regenerating circuit connects to the gate of a commutating switch controlling switch element, which connects to one end of an auxiliary winding, the other end thereof being connected to the gate of a commutating switch element. Accordingly, the rectifying switch element is directly controlled from the primary side.

9 Claims, 14 Drawing Sheets

SYNCHRONOUS RECTIFYING FORWARD CONVERTER

CROSS-REFERENCE TO RELATED APPLICATIONS

This is a continuation under 35 U.S.C. §111(a) of PCT/JP2006/317626 filed Sep. 6, 2006, and claims priority of JP2005-304763 filed Oct. 19, 2005, incorporated by reference.

BACKGROUND OF THE INVENTION

1. Technical Field

The present invention relates to a forward converter to synchronously rectify an output current.

2. Background Art

A conventional synchronous rectifying forward converter is disclosed in Patent Document 1 (Japanese Unexamined Patent Application Publication No. 2000-262051). FIG. 1 shows the circuit of the converter according to Patent Document 1.

In the circuit shown in FIG. 1, after a main switch element 2 on the primary side of a transformer 4 is turned ON, a voltage generated at a secondary winding 4b of the transformer 4 causes a rectifying-side synchronous rectifier element 5 on the secondary side to be turned ON and a commutating-side synchronous rectifier element 6 to be turned OFF. If the turn-OFF of the commutating-side synchronous rectifier element 6 delays, a short circuit path including the two synchronous rectifier elements 5 and 6 is formed. Thus, a driving switch element 7 is provided in series with a tertiary winding 4c of the transformer 4 and the driving switch element 7 is tuned ON at the timing of turning ON the main switch element 2 on the primary side. With this configuration, a charge due to the gate capacitance of the commutating-side synchronous rectifier element 6 is discharged via the driving switch element 7 just before turn-ON of the main switch element 2 on the primary side, and the commutating-side synchronous rectifier element 6 is quickly turned OFF, so that a short circuit is prevented.

However, in the synchronous rectifying forward converter of so-called indirect control type shown in FIG. 1, which controls the synchronous rectifier elements 5 and 6 by using a winding voltage of the transformer, the following problem occurs. That is, when a switching operation of the main switch stops or when a relatively high voltage is applied to an output terminal, self-excited oscillation occurs on the secondary side and electric power flows back (regenerates) from the secondary side to the primary side.

Also, since the commutating-side synchronous rectifier element 6 is controlled by ON timing of the main switch element 2, the following problem occurs. That is, when a switch element driving circuit 12 stops, the commutating-side synchronous rectifier element 6 is not turned OFF and is kept in an ON-state until it is turned OFF due to current leakage between the gate and source of the commutating-side synchronous rectifier element 6. Therefore, if an overvoltage is applied (flows back) from the output side, a choke coil 8 on the secondary side is excited to cause self-excited oscillation.

The rectifying-side synchronous rectifier element 5 is turned ON by being supplied with the gate voltage thereof from the transformer 4. In a case where excitation of the choke coil 8 on the secondary side is performed from the primary side, when the excitation of the choke coil 8 ends at turn-OFF of the main switch element 2, the voltage thereof is inverted and thus the rectifying-side synchronous rectifier element 5 is turned OFF. In a case where excitation of the choke coil 8 is performed from the output side, the synchronous rectifier element 5 is turned OFF by reset of the excitation state of the choke coil 8 and inversion of the voltage. Accordingly, there exists a mode where the ON-period of the transformer 4 from the secondary side is controlled in accordance with the excitation state of the choke coil 8. The switch element driving circuit 12 tries to stabilize an output voltage by performing PWM (pulse width modulation) control on the main switch element 2 in accordance with the voltage obtained by rectifying and smoothing the winding voltage of the transformer 4. However, occurrence of the above-described backflow causes an increase in the winding voltage of the transformer 4, so that the control by the switch element driving circuit 12 stops. Even if the control by the switch element driving circuit 12 does not stop, control using the above-described winding voltage of the transformer and control using the choke coil 8 are mixed, which causes abnormal oscillation.

Furthermore, the circuit operation becomes unstable due to excitation of the choke coil 8 and the ON-period of the synchronous rectifier elements 5 and 6 is not controlled, so that disadvantageously a reverse current from the output side cannot be absorbed.

SUMMARY OF THE INVENTION

An advantageous feature of the present invention is to solve the above-described problems and to provide a synchronous rectifying forward converter capable of preventing abnormal oscillation and self-excited oscillation when a backflow operation occurs due to an output overvoltage, and suppressing backflow of a current from the output side.

In order to solve the above-described problems, the synchronous rectifying forward converter according to embodiments of the present invention may have some or all of the following features.

[1] A synchronous rectifying forward converter includes a transformer (T1) including a primary winding, a secondary winding, and a tertiary winding; a main switch element (Q1) connected in series to the primary winding of the transformer (T1); a choke coil (L2) connected in series to the secondary winding (N2) of the transformer (T1); a smoothing capacitor (C1) connected in parallel between output terminals; a rectifying switch element (Q2) that is connected in series to the secondary winding (N2) of the transformer (T1) and that is turned ON/OFF in synchronization with ON/OFF of the main switch element (Q1); a commutating switch element (Q3) that is turned OFF/ON in synchronization with ON/OFF of the main switch element (Q1) and that forms a path to emit excitation energy of the choke coil by being turned ON; and a switching control circuit (23) to apply a drive signal to the main switch element (Q1). The synchronous rectifying forward converter is provided with a synchronous rectifier element driving circuit (24) that transmits only ON timing and OFF timing as trigger pulses in the drive signal of the main switch element (Q1) output from the switching control circuit (23) from the primary side to the secondary side via pulse transformers (T2 and T3) and that regenerates a drive signal to turn ON the rectifying switch element (Q2) at turn-ON of the main switch element (Q1) or turn ON the commutating switch element (Q3) at turn-OFF of the main switch element (Q1) on the basis of the trigger pulses.

[2] The synchronous rectifier element driving circuit (24) includes a control voltage signal generating circuit (26) to generate a control voltage for the rectifying switch element (Q2); a rectifying switch ON controlling switch circuit (27) to apply the control voltage generated by the control voltage signal generating circuit (26) to the rectifying switch element (Q2) at turn-ON of the main switch element (Q1); and a rectifying switch controlling switch element (Q5) to forcefully turn OFF the rectifying switch element (Q2) by controlling the voltage of a control terminal of the rectifying switch element (Q2) at turn-OFF of the main switch element (Q1).

[3] The synchronous rectifier element driving circuit (24) includes a control voltage signal generating circuit (26) to generate a control voltage for the commutating switch element (Q3); a commutating switch ON controlling switch circuit (28) to apply the control voltage generated by the control voltage signal generating circuit (26) to the commutating switch element (Q3) at turn-OFF of the main switch element (Q1); and a commutating switch controlling switch element (Q4) to forcefully turn OFF the commutating switch element (Q3) by controlling the voltage of a control terminal of the commutating switch element (Q3) at turn-ON of the main switch element (Q1).

[4] In order to drive the commutating switch element (Q3), a commutating switch element control circuit (31) to control the voltage of the control terminal of the commutating switch element (Q3) on the basis of an ON/OFF control signal of the rectifying switch element (Q2) is provided.

[5] The pulse transformers (T2 and T3) include a first pulse transformer (T2) to transmit ON timing as a trigger pulse in the drive signal of the main switch element (Q1) output from the switching control circuit (23) from the primary side to the secondary side; and a second pulse transformer (T3) to transmit OFF timing as a trigger pulse in the drive signal of the main switch element (Q1) output from the switching control circuit (23) from the primary side to the secondary side.

[6] A diode bridge to output an ON timing signal and an OFF timing signal of the main switch element (Q1) is provided on the secondary side of the pulse transformer (T2) of the synchronous rectifier element driving circuit (24).

[7] The synchronous rectifier element driving circuit (24) includes a flip-flop (34) of which state is switched at ON and OFF of the main switch element (Q1), the flip-flop controlling the rectifying switch element (Q2) or the commutating switch element (Q3) by using the state signal.

Each of the disclosed embodiments has some or all of the following advantages.

[1] The synchronous rectifying forward converter is provided with the synchronous rectifier element driving circuit (24) that transmits only ON timing and OFF timing as trigger pulses in the drive signal of the main switch element (Q1) output from the switching control circuit (23) from the primary side to the secondary side via pulse transformers (T2 and T3) and that regenerates a drive signal to turn ON the rectifying switch element (Q2) at turn-ON of the main switch element (Q1) or turn ON the commutating switch element (Q3) at turn-OFF of the main switch element (Q1) on the basis of the trigger pulses. Accordingly, the rectifying switch element or the commutating switch element on the secondary side is reliably turned OFF at stop of the control on the primary side, and thus self-excited oscillation can be prevented.

[2] The synchronous rectifier element driving circuit (24) includes the control voltage signal generating circuit (26) to generate a control voltage for the rectifying switch element (Q2); the rectifying switch ON controlling switch circuit (27) to apply the control voltage generated by the control voltage signal generating circuit (26) to the rectifying switch element (Q2) at turn-ON of the main switch element (Q1); and the rectifying switch controlling switch element (Q5) to forcefully turn OFF the rectifying switch element (Q2) by controlling the voltage of a control terminal of the rectifying switch element (Q2) at turn-OFF of the main switch element (Q1). Accordingly, the output capacitance (parasitic capacitance) of the rectifying switch element (Q2), the output capacitance (parasitic capacitance) of the commutating switch element (Q3), and the choke coil L2 perform free resonance, so that an excited state of the choke coil (L2) can be reset without increasing the ON-period of the transformer and that self-excited oscillation can be prevented.

[3] The synchronous rectifier element driving circuit (24) includes the control voltage signal generating circuit (26) to generate a control voltage for the commutating switch element (Q3); the commutating switch ON controlling switch circuit (28) to apply the control voltage generated by the control voltage signal generating circuit (26) to the commutating switch element (Q3) at turn-OFF of the main switch element (Q1); and the commutating switch controlling switch element (Q4) to forcefully turn OFF the commutating switch element (Q3) by controlling the voltage of a control terminal of the commutating switch element (Q3) at turn-ON of the main switch element (Q1). Accordingly, the commutating switch element (Q3) is forcefully turned OFF/ON in synchronization with ON/OFF of the main switch element (Q1), so that the ON-period of the transformer does not change and that the voltage of the tertiary winding of the transformer does not rise at backflow. Also, a stable operation is performed with backflow from the output being regenerated to the primary side until the choke coil (L2) is saturated. Also, the commutating switch element (Q3) is forcefully turned OFF and thus self-excited oscillation does not occur.

[4] In order to drive the commutating switch element (Q3), the commutating switch element control circuit (31) to control the voltage of the control terminal of the commutating switch element (Q3) on the basis of an ON/OFF control signal of the rectifying switch element (Q2) is provided. Accordingly, both the rectifying switch element (Q2) and the commutating switch element (Q3) are forcefully turned ON/OFF in synchronization with the main switch element (Q1), so that self-excited oscillation is prevented.

[5] The first pulse transformer (T2) to transmit ON timing as a trigger pulse in the drive signal of the main switch element (Q1) output from the switching control circuit (23) from the primary side to the secondary side; and the second pulse transformer (T3) to transmit OFF timing as a trigger pulse from the primary side to the secondary side are provided. Accordingly, the circuit connected to the primary side and the secondary side of the pulse transformers (T2 and T3) is not complicated, and thus an ON timing signal and an OFF timing signal can be reliably separated.

[6] The diode bridge to output an ON timing signal and an OFF timing signal of the main switch element (Q1) is provided on the secondary side of the pulse transformer (T2) of the synchronous rectifier element driving circuit (24). Accordingly, ON timing and OFF timing of the main switch element (Q1) can be transmitted from the primary side to the secondary side by using a single pulse transformer, and thus the number of components can be reduced.

[7] The synchronous rectifier element driving circuit (24) includes the flip-flop (34) of which state is switched at ON and OFF of the main switch element (Q1), the flip-flop controlling the rectifying switch element (Q2) or the commutating switch element (Q3) by using the state signal. Accordingly, the number of components can be easily reduced by using the integrated flip-flop.

Other features and advantages of the present invention will become apparent from the following description of embodiments of the invention which refers to the accompanying drawings.

DETAILED DESCRIPTION OF EMBODIMENTS OF THE INVENTION

Figure 1:
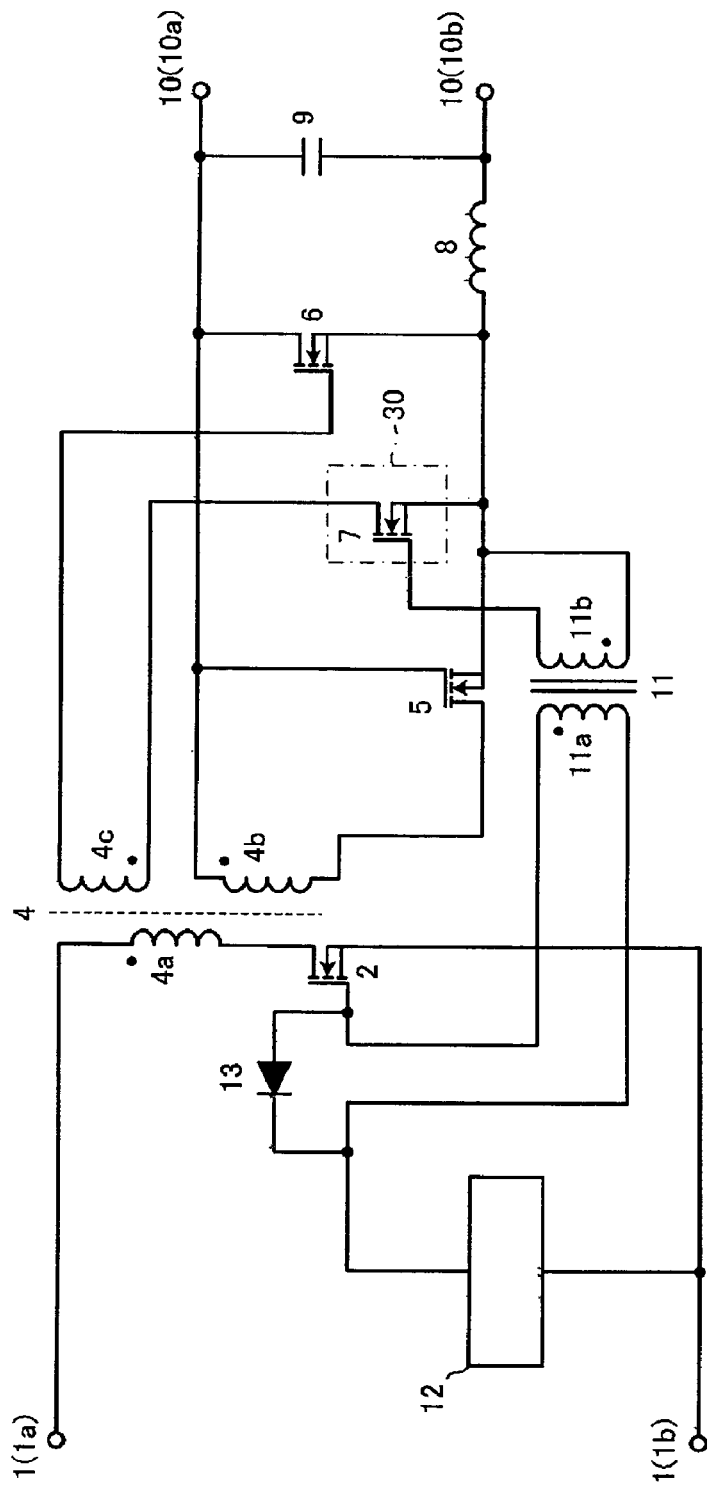
FIG. 1 is a circuit diagram showing a configuration of a converter according to Patent Document 1.

| Reference Numerals | |
|---|---|
| 21 | input terminal |
| 22 | tertiary rectifying and smoothing circuit |
| 23 | switching control circuit |
| 24 | synchronous rectifier element driving circuit |
| 25, 29, 30, and 33 | drive control signal regenerating circuit |
| 26 | control voltage signal generating circuit |
| 27 | rectifying switch ON controlling switch circuit |
| 28 | commutating switch ON controlling switch circuit |
| 31 | commutating switch element driving circuit |
| 32 | output terminal |
| 34 | flip-flop |
| 35 and 36 | driver |
| Q1 | main switch element |
| Q2 | rectifying switch element |
| Q3 | commutating switch element |
| Q4 | commutating switch controlling switch element |
| Q5 | rectifying switch controlling switch element |
| Q6 and Q7 | controlling switch element |
| T1 | main transformer |
| T2 and T3 | pulse transformer |
| N11 | primary winding |
| N12 | secondary winding |
| N13 | tertiary winding |
| N14 | auxiliary winding |
| L1 and L2 | choke coil |
| C1 | smoothing capacitor |

EMBODIMENTS OF THE INVENTION

First Embodiment

A configuration of a synchronous rectifying forward converter according to a first embodiment is described with reference to FIG. 2.

Figure 2:
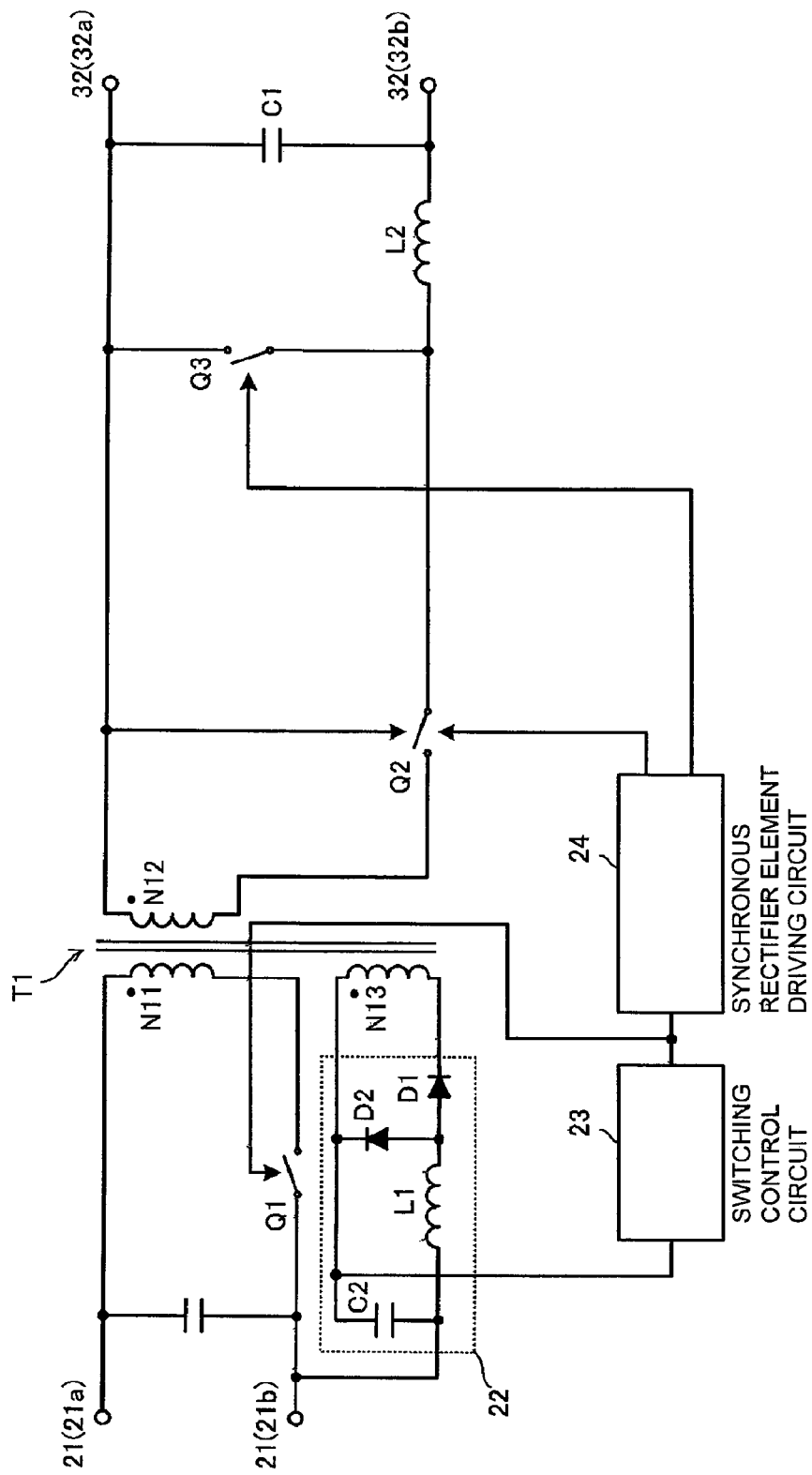
FIG. 2 is a circuit diagram of a synchronous rectifying forward converter according to a first embodiment.

FIG. 2 is a circuit diagram of the synchronous rectifying forward converter. Part of this figure is illustrated with blocks and symbols. As shown in FIG. 2, a main transformer T1 includes a primary winding N11, a secondary winding N12, and a tertiary winding N13. The primary winding N11 connects in series to a main switch element Q1, and a capacitor is connected between input terminals 21 (21a and 21b). The secondary winding N12 of the main transformer T1 connects in series to a choke coil L2 and a rectifying switch element Q2, and a smoothing capacitor C1 is connected between output terminals 32 (32a and 32b). Also, a commutating switch element Q3 forms a loop together with the choke coil L2 and the smoothing capacitor C1 and is placed at a position in a commutating path during release of excitation energy of the choke coil L2.

The tertiary winding N13 of the main transformer T1 connects to a tertiary rectifying and smoothing circuit 22 including diodes D1 and D2, a choke coil L1, and a capacitor C2. A switching control circuit 23 receives an output of the tertiary rectifying and smoothing circuit 22 as power and as an indirect output voltage detecting signal, and outputs a switching control signal to the main switch element Q1.

The circuit is configured so that an electromotive voltage of the secondary winding N12 of the main transformer T1 is applied to a control terminal of the rectifying switch element Q2.

A synchronous rectifier element driving circuit 24 receives a switching control signal to the main switch element Q1 output from the switching control circuit 23 and drives the rectifying switch element Q2 and the commutating switch element Q3 in synchronization with the input of the switching control signal.

Before describing an operation of the synchronous rectifying forward converter shown in FIG. 2, the operation and effect of the synchronous rectifier element driving circuit 24 are clarified. Hereinafter, a case of using an indirect driving type (winding driving type) where the rectifying switch element Q2 is driven only by the secondary winding N12 of the main transformer T1 and a case where the rectifying switch element Q2 is directly driven from the primary side via the synchronous rectifier element driving circuit 24 are described with reference to the waveform diagram shown in FIG. 3.

Figure 3:
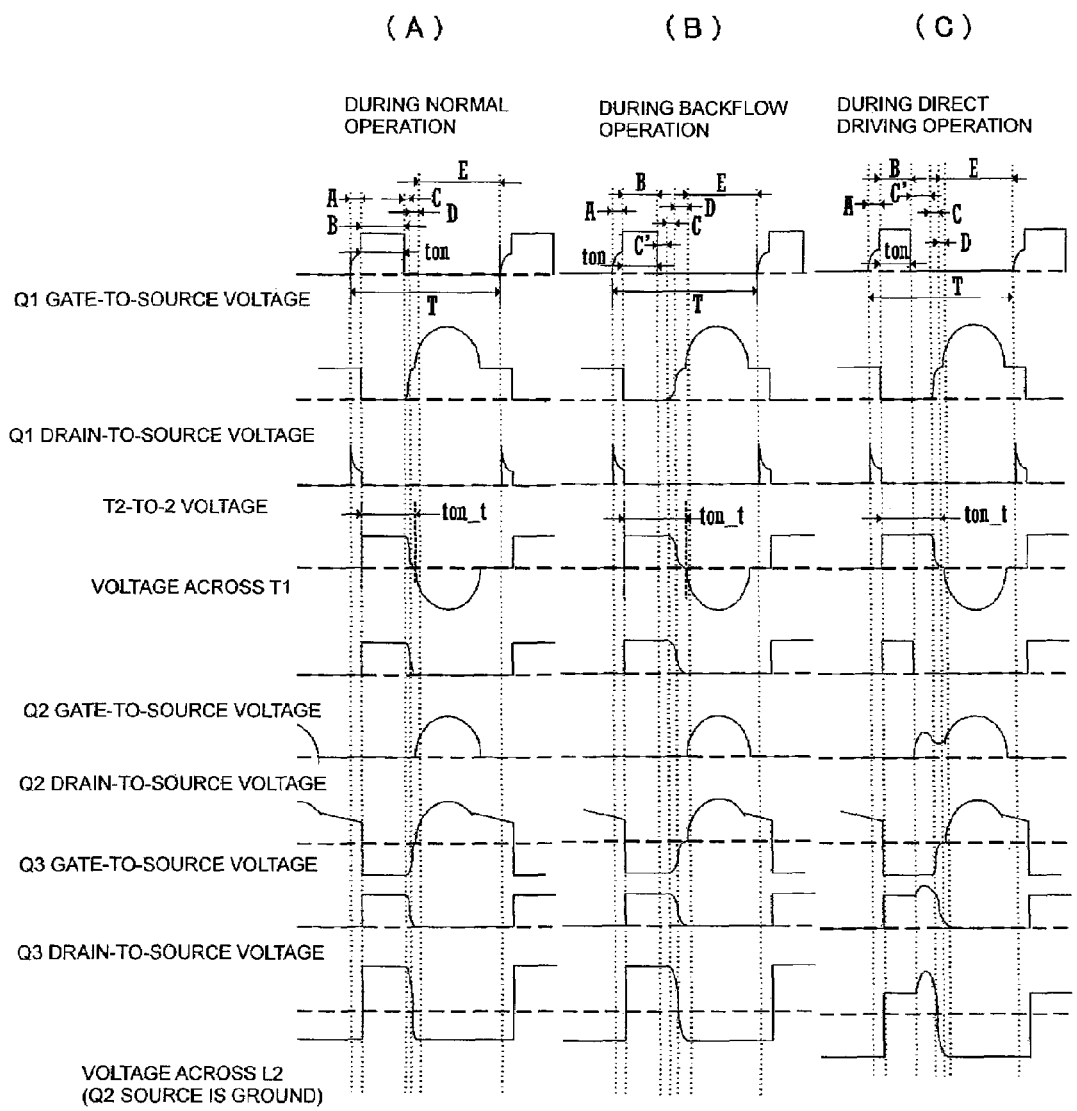
FIG. 3 illustrates waveforms of a main part of the converter.

In FIG. 3, (A) illustrates waveforms in a normal operation of the indirect driving type; (B) illustrates waveforms in a backflow operation of the indirect driving type; and (C) illustrates waveforms in an operation of a direct driving type.

<Normal Operation>

In FIG. 3, (A) illustrates waveforms in the normal operation. In (A), the states of respective periods A to E are as follows.

Period A: Trigger transmitting period before ON of Q1, and OFF-period of Q3

Period B: ON-period of Q1, and ON-period of the transformer

Period B is an excitation period caused by an input power supply of the choke coil L2 (the electric power is transmitted from the input side to the output side).

Period C: Inversion period of the choke coil L2, OFF-period of Q1, and ON-period of the transformer Period D: OFF-period of both Q2 and Q3

Period E: ON-period of Q3 (excitation reset period of the choke coil L2)

In the normal operation of the indirect driving type, a voltage applied from the switching control circuit 23 to the gate of the main switch element Q1 causes turn-ON of the main switch element Q1. The turn-ON of the main switch element Q1 causes a current to flow to the primary winding N11 of the main transformer T1. Accordingly, an electromotive voltage of the secondary winding N12 causes turn-ON of the rectifying switch element Q2 and a current flows through a path N12→C1→L2→Q2→N12, so that the capacitor C1 is charged and that an exciting energy is accumulated in the choke coil L2. At this time, the synchronous rectifier element driving circuit 24 does not turn ON the commutating switch element Q3, and thus the commutating switch element Q3 is kept in an OFF-state.

After the main switch element Q1 is turned OFF under control by the switching control circuit 23, the electromotive voltage of the secondary winding N12 is inverted and the control terminal voltage of the rectifying switch element Q2 is inverted, so that the rectifying switch element Q2 is turned OFF. On the other hand, the synchronous rectifier element driving circuit 24 turns ON the commutating switch element Q3 in synchronization with the turn-OFF of the main switch element Q1. Accordingly, commutation occurs in a path L2→Q3→C1→L2.

The above-described rectification and commutation are repeated in accordance with ON and OFF of the main switch element Q1.

As described above, in the normal operation, the choke coil L2 is excited by input power, and the excitation of the choke coil L2 is reset by transmission of the power to the output.

<Backflow Operation of the Indirect Driving Type>

In FIG. 3, (B) illustrates waveforms in the backflow operation. In (B), the states of respective periods A to E are as follows.

Period A: Trigger transmitting period before ON of Q1, and OFF-period of Q3

Period B: ON-period of Q1, and ON-period of the transformer

Unlike in the normal operation, period B is an excitation reset period of the choke coil L2, when power is regenerated from the output side to the input side.

Period C': Power regenerating period to the input side by backflow, OFF-period of Q1, ON-period of the transformer, and excitation reset period of the choke coil L2

The period corresponding to period C' does not exist in the normal operation illustrated in (A) in FIG. 3.

Period C: Inversion period of the choke coil L2, OFF-period of Q1, and ON-period of the transformer Period D: OFF-period of both Q2 and Q3

Period E: ON-period of Q3 (excitation period by an output applied voltage of the choke coil L2)

In this way, in the backflow operation, the choke coil is excited by power supplied from the output, and the power is regenerated to the input. When an abnormal voltage over a normal operation voltage is applied from the output or when an excessive voltage occurs in the output at a transient sudden change of an output load, the choke coil L2 is excessively excited unlike in the normal operation if no measures are taken.

That is, in the normal operation, the ON-duty ratio of the main switch element Q1 (Q1 ON-period ton/switching cycle T) and the ON-duty ratio of the transformer (the period when an input voltage is applied to the transformer ton_t/switching cycle T) substantially match with each other (a little different in period C). On the other hand, in the backflow operation, ton<ton_t is satisfied, so that the ON-duty ratios of the main switch element Q1 and the transformer do not match due to occurrence of period C'.

<Direct Driving Operation>

In FIG. 3, (C) illustrates waveforms in the direct driving operation. In (C), the states of respective periods A to E are as follows.

Period A: Trigger transmitting period before ON of Q1, and OFF-period of Q3

Period B: ON-period of Q1, and ON-period of the transformer

Unlike in the normal operation, period B is an excitation reset period of the choke coil L2, when power is regenerated from the output side to the input side.

Period C': Period when drain-to-source capacitance of the rectifying switch element Q2 and the choke coil L2 resonate (free resonance) and excitation of the choke coil L2 is reset Period C: Inversion period of the choke coil L2, OFF-period of Q1, and ON-period of the transformer Period D: OFF-period of both Q2 and Q3

Period E: ON-period of Q3 (excitation period by the output applied voltage of the choke coil L2)

If an abnormal voltage Vab exceeding a normal operation voltage Vo occurs between the output terminals 32a and 32b shown in FIG. 2, the abnormal voltage is applied to the choke coil L2 and the choke coil L2 is excited at turn-ON of the commutating switch element Q3. In the choke input rectifying forward converter according to this embodiment, the following expressions are typically established under the following conditions: the ON-duty ratio of the main transformer T1 is D; the number of turns of the primary winding N11 of the main transformer T1 is n1; the number of turns of the secondary winding N12 of the main transformer T1 is n2; the number of turns of the tertiary winding of the main transformer T1 is n3; a secondary output voltage is Vo; a tertiary output voltage is Vt; and an input voltage is Vin.

$$Vo = (n2/n1) \times D \times Vin \qquad (1)$$

$$Vt = (n3/n1) \times D \times Vin \qquad (2)$$

If the above-described abnormal voltage Vab occurs, magnetic flux density ΔB expressed by the following expression occurs in the choke coil L2 when the switching cycle is T and when a rated output voltage is Voc.

$$\Delta B = Vab(1-D)/T > \Delta Bc = Voc(1-D)/T \qquad (3)$$

Herein, ΔBc is the amount of change in magnetic flux density generated in the choke coil L2 at output of the rated voltage.

ΔB needs to be reset during the ON-period of the transformer. Assuming that a reset voltage at the rated voltage is V12rc, the voltage of the choke coil L2 in the ON-period of the transformer is suppressed by the input voltage Vin and the abnormal voltage Vab of output, so that the choke coil reset voltage V12r is expressed by the following expression.

$$V12r = (n2/n1) \times Vin - Vab < V12rc \qquad (4)$$

Assuming that the time required for resetting ΔB is t12r and that a reset period during the normal operation is t12rc, $$t12r = \Delta B/V12r > t12rc = \Delta Bc/V12rc$$

is satisfied, which is longer than a normal ON-period of the transformer. This operation is common when the secondary winding of the transformer is used to drive the rectifying switch element Q2 and is caused by the fact that turn-OFF of the rectifying switch element Q2 is not controlled by the switching control circuit on the primary side.

On the other hand, in the direct driving operation, the rectifying switch element Q2 and the main switch element Q1 are turned OFF at the same time, and the choke coil L2 and output capacitance (parasitic capacitance existing in parallel with the switch) of the rectifying switch Q2 on the secondary side cause a free resonance phenomenon, so that the above-described ΔB can be reset in a shorter period than t12r. When half cycle Tres of the resonance frequency of the above-described free resonance is D·T>Tres, an increase in the ON-period of the transformer caused by excitation of the choke coil L2 can be prevented. Although an output pulse from the switching control circuit 23 is short, the ON-period of the transformer does not extend, and control is performed under a state where the voltage of the tertiary winding N13 does not rise. That is, although the ON-duty ratio of the main switch element Q1 does not match the ON-duty ratio of the transformer, the ON-period of the transformer is indirectly controlled so that the voltage of the tertiary winding of the transformer is constant, and thus the ON-duty of the transformer is fixed so that it is not changed by an applied voltage. In this way, backflow is prevented.

Also, a flown back current can be absorbed in the following manner: the commutating switch element Q3 is turned OFF at turn-ON of the main switch element Q1, and is turned ON at turn-OFF of the main switch element Q1 by opposite synchronization, the ON-period of the rectifying switch element Q2 is kept constant, and biased magnetization is caused in the choke coil L2. The rectifying switch element Q2 keeps a constant ON-period and thus abnormal oscillation does not occur.

Furthermore, the rectifying switch element Q2 and the commutating switch element Q3 stop at the same time as stop of the switching control circuit 23, and the transformer is not excited by vibration caused by excitation of an output choke and reset of the excited state, so that self-excited oscillation does not occur.

Accordingly, the following effects can be obtained.

Drive of the rectifying switch element Q2 in synchronization with drive of the main switch element Q1 generates a backflow preventing circuit function to control backflow current.

Drive of the commutating switch element Q3 in opposite synchronization with ON and OFF of the main switch element Q1 enables absorption of backflow current without causing abnormal oscillation.

Drive of the rectifying switch element Q2 or the commutating switch element Q3 in synchronization with drive of the main switch element Q1 prevents self-excited oscillation.

Second Embodiment

Hereinafter, a configuration of a synchronous rectifying forward converter according to a second embodiment is described with reference to FIGS. 4 to 6.

Figure 4:
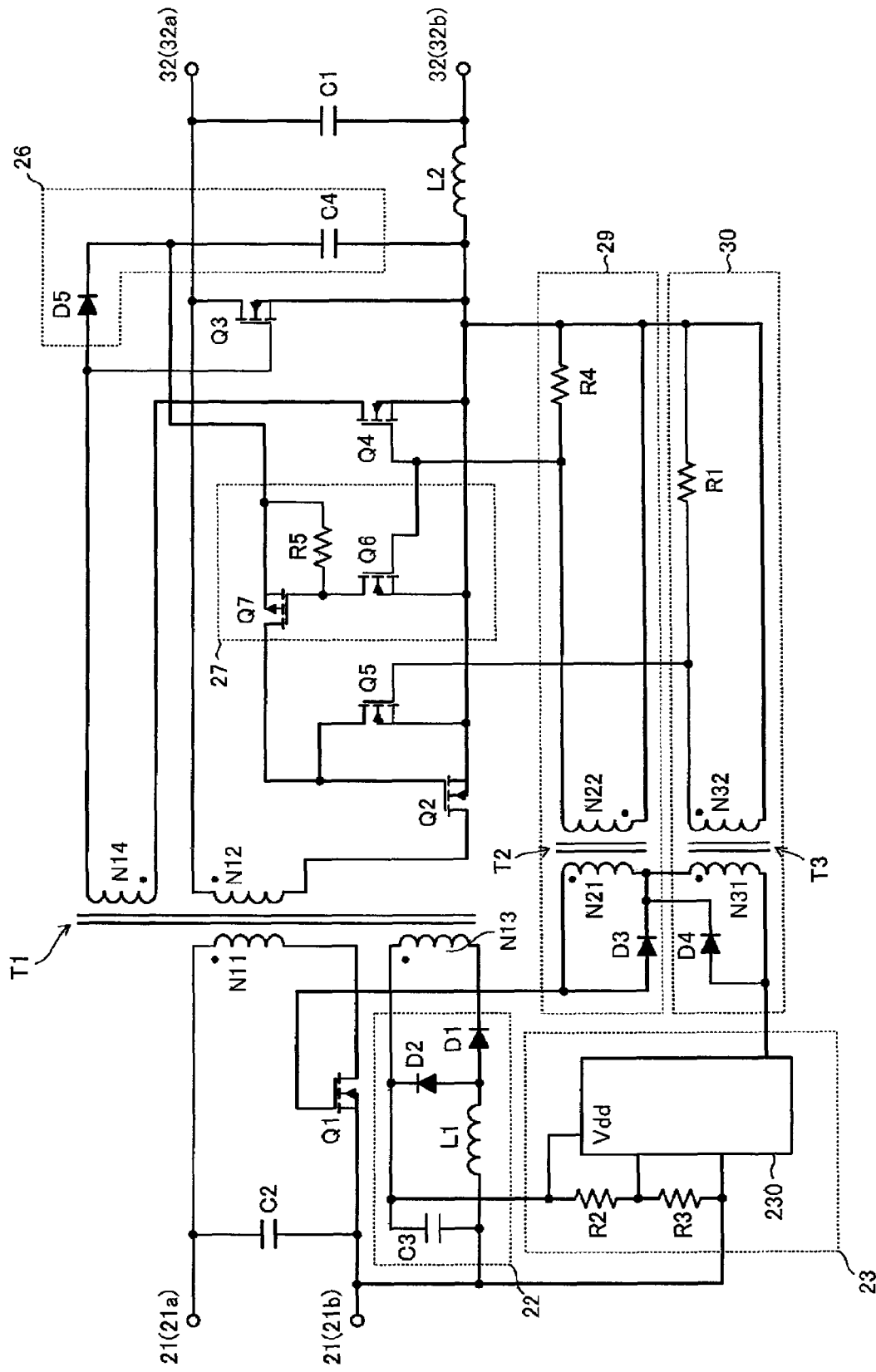
FIG. 4 is a circuit diagram of a synchronous rectifying forward converter according to a second embodiment.
Figure 5:
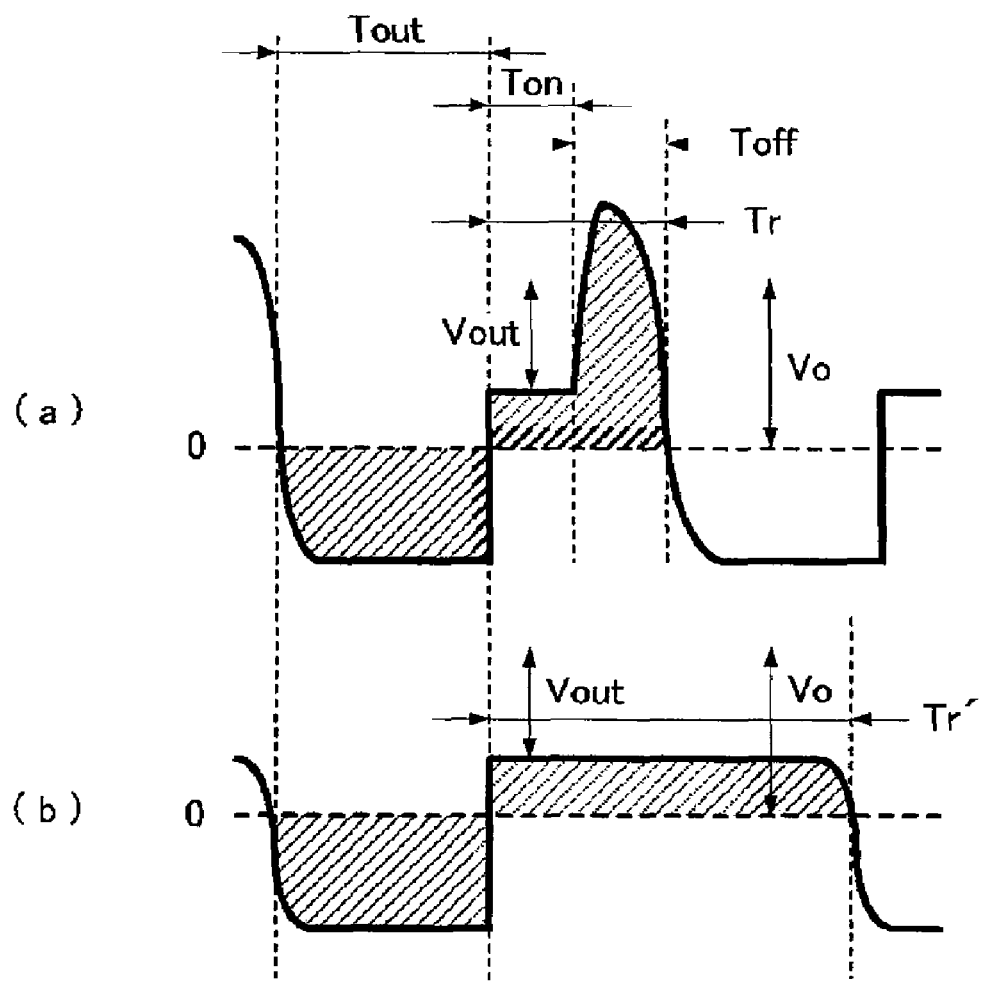
FIG. 5 illustrates waveforms of a main part of the converter.
Figure 6:
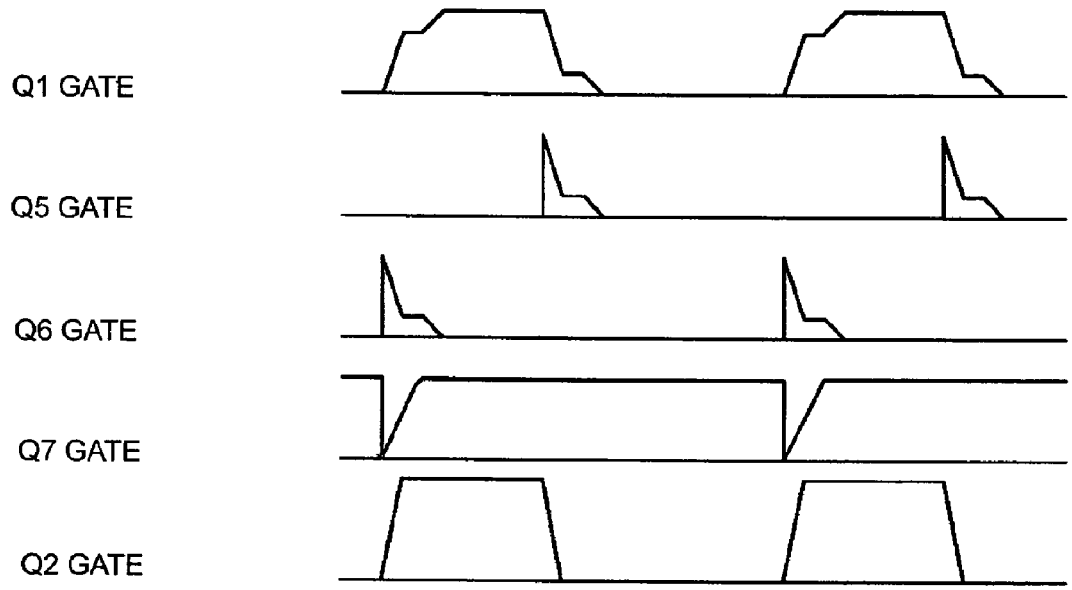
FIG. 6 illustrates waveforms of a main part of the converter.

FIG. 4 is a circuit diagram of the synchronous rectifying forward converter according to the second embodiment, and FIGS. 5 and 6 are waveform diagrams of a main part thereof.

As shown in FIG. 4, the switching control circuit 23 operates by using an output from the tertiary rectifying and smoothing circuit 22 as power and includes a switching controlling IC 230 to receive divided voltage from resistors R2 and R3 of the same output. The switching controlling IC 230 outputs switching control signals to the gate of the main switch element Q1 via primary windings N21 and N31 of pulse transformers T2 and t3. At that time, the switching controlling IC 230 performs PWM control on the main switch element Q1 so that the above-described divided voltage match a reference voltage on the basis of the received divided voltage and the reference voltage.

The primary winding N21 of the pulse transformer T2 connects to a diode D3 for resetting excitation of the pulse transformer T2. By providing the diode D3 in this orientation, a pulse of an ON timing signal is output from a secondary winding N22 only when a signal to turn ON the main switch element Q1 is output from the switching control circuit 23. The secondary winding N22 of the pulse transformer T2 connects to a resistor R4 for adjusting an output voltage. The pulse transformer T2, the diode D3, and the resistor R4 form a drive control signal regenerating circuit 29.

The primary winding N31 of the pulse transformer T3 connects to a diode D4 for resetting excitation of the pulse transformer T3. By providing the diode D4 in this orientation, a pulse of an OFF timing signal is output from a secondary winding N32 only when a signal to turn OFF the main switch element Q1 is output from the switching control circuit 23. The secondary winding N32 of the pulse transformer T3 connects to a resistor R1 for adjusting an output voltage. The pulse transformer T3, the diode D4, and the resistor R1 form a drive control signal regenerating circuit 30.

A rectifying switch controlling switch element Q5 is connected between the gate and source of the rectifying switch element Q2. The output of the drive control signal regenerating circuit 30 is connected between the gate and source of the rectifying switch controlling switch element Q5.

The gate of the commutating switch element Q3 connects to one end of an auxiliary winding N14 of the main transformer T1, and the other end of the auxiliary winding N14 connects to the drain of a commutating switch controlling switch element Q4. The output of the drive control signal regenerating circuit 29 is connected between the gate and source of the commutating switch controlling switch element Q4.

A diode D5 and a capacitor C4 are connected in series between the one end of the auxiliary winding N14 of the main transformer T1 (the end connected to the gate of Q3) and the ground. The drain-to-source of a controlling switch element Q7 is connected in series between a charging voltage output terminal, which is a node between the capacitor C4 and the diode D5, and the gate of the rectifying switch element Q2. A resistor R5 for supplying an OFF current of the controlling switch element Q7 is connected between the gate and source of the controlling switch element Q7, and a controlling switch element Q6 is connected between the gate of the controlling switch element Q7 and the ground. Also, the output of the drive control signal regenerating circuit 29 is connected between the gate and source of the controlling switch element Q6.

In the second embodiment, the commutating switch element Q3 is controlled by the voltage of the auxiliary winding N14 of the main transformer T1. On the other hand, a control voltage signal is generated by a control voltage signal generating circuit 26 including the diode D5 and the capacitor C4 by using the voltage of the auxiliary winding N14, and the control voltage signal is applied to the rectifying switch element Q2 via the P-type controlling switch element Q7.

In a normal state, the controlling switch element Q7 is in an OFF-state due to a current supplied via the resistor R5. The rectifying switch controlling switch element Q5 and the controlling switch element Q6 are also in an OFF-state in the normal state. If an ON trigger pulse of the main switch element Q1 is transmitted via the pulse transformer T2 when the rectifying switch element is OFF, an ON timing drive signal is output from the drive control signal regenerating circuit 29, the controlling switch element Q6 is turned ON, the controlling switch element Q7 is turned ON, and the rectifying switch element Q2 is turned ON. Then, the controlling switch element Q6 is immediately turned OFF and also the controlling switch element Q7 is immediately turned OFF. However, the rectifying switch element Q2 is kept in an ON-state due to the charge between the gate and source thereof.

Then, after an OFF trigger pulse of the main switch element Q1 is transmitted via the pulse transformer T3, an OFF timing drive signal is output from the drive control signal regenerating circuit 30, and the rectifying switch controlling switch element Q5 is turned ON. The rectifying switch controlling switch element Q5 discharges the charge between the gate and source of the rectifying switch element Q2, and thus the rectifying switch element Q2 is turned OFF. Then, the rectifying switch controlling switch element Q5 is immediately turned OFF. Since the controlling switch element Q7 is OFF and there is no current supplying path to the gate of the rectifying switch element Q2, the rectifying switch element Q2 is kept in an OFF-state.

FIG. 6 illustrates waveforms of the gate voltages of the switch elements Q1, Q5, Q6, Q7, and Q2 shown in FIG. 4. As shown in the figure, the switch elements Q6, Q7 and Q2 are turned ON at turn-ON of the main switch element Q1. The switch element Q5 is turned ON and the switch element Q2 is turned OFF at turn-OFF of the main switch element Q1. In this way, the rectifying switch element Q2 is directly driven by control of the primary side.

If an abnormal voltage occurs at the output in the circuit shown in FIG. 4, the choke coil L2 is excited in an ON-period of the commutating switch element Q3. However, turn-OFF of the controlling switch element Q7 in synchronization with the main switch element Q1 causes free resonance between the output capacitance of the rectifying switch element Q2 (parasitic capacitance between drain and source) and the output capacitance of the commutating switch element Q3 (parasitic capacitance between drain and source) and the choke coil L2, and the excited state of the choke coil L2 can be reset without increasing the ON-period of the transformer. The reset time of the choke coil L2 is the difference between the ON-period of the main transformer T1 and the ON-period of the main switch element Q1. Since PWM control is performed to keep the output voltage of the tertiary rectifying and smoothing circuit 22 constant, the reset time is automatically generated.

FIG. 5(a) illustrates change in the voltage across the choke coil L2 shown in FIG. 4. FIG. 5(b) illustrates a comparative example of change in the voltage across the choke coil L2 in a case where the rectifying switch element Q2 shown in FIG. 4 is not controlled from the primary side but is controlled by the voltage of the secondary winding N12. Herein, Tout represents an excitation period by output, Ton represents an ON-period of the rectifying switch element Q2 (=ON-period of the main switch element Q1), and Toff represents an OFF-period of the rectifying switch element Q2 and the commutating switch element Q3. When the hatched parts in the figure have the same area in positive and negative, reset of the excited state completes. That is, Ton+Toff (=Tr) is the reset period of the choke coil L2.

The voltage Vout of the ON-period Ton of the rectifying switch element Q2 is an output voltage (this voltage is fixed due to an external applied voltage). When the numbers of turns of the primary winding N11 and the secondary winding N12 of the main transformer T1 are n11 and n12, respectively, and when the input voltage is Vin, the voltage Vo can be expressed by the following expression.

$$Vo = (n12/n11)Vin$$

If backflow occurs when the rectifying switch element Q2 is not controlled from the primary side but is controlled by the voltage of the secondary winding N12, a reset period Tr' of the choke coil L2 becomes long as shown in FIG. 5(b). On the other hand, when the rectifying switch element Q2 is controlled from the primary side, control of the switching control circuit 23 on the primary side is performed in a state where the excitation period of the transformer does not extend and the voltage of the tertiary winding N13 does not rise as shown in FIG. 5(a). As a result, the output voltage can be stably controlled by controlling the ON-period of the main switch element Q1 (ON-period of the main transformer T1) so that the output voltage of the tertiary rectifying and smoothing circuit 22 becomes constant. Also, occurrence of abnormal oscillation can be prevented. Furthermore, a problem of stress of the main switch element Q1, caused by a state where the ON-period of the transformer extends beyond the control range of the switching control circuit 23 and the excited state of the main transformer T1 cannot be reset, can be solved.

Third Embodiment

Hereinafter, a configuration of a synchronous rectifying forward converter according to a third embodiment is described with reference to FIGS. 7 and 8.

Figure 7:
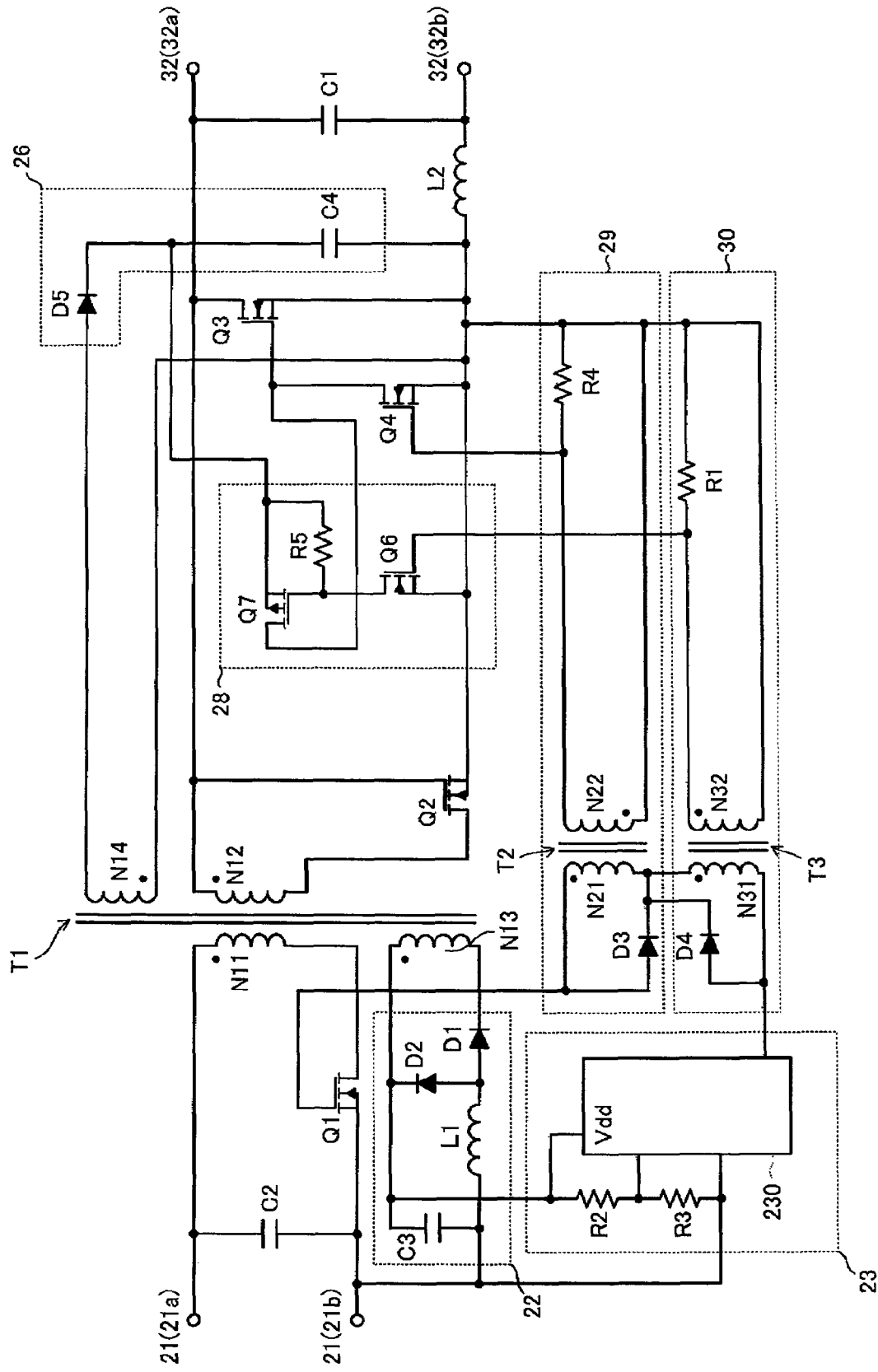
FIG. 7 is a circuit diagram of a synchronous rectifying forward converter according to a third embodiment.
Figure 8:
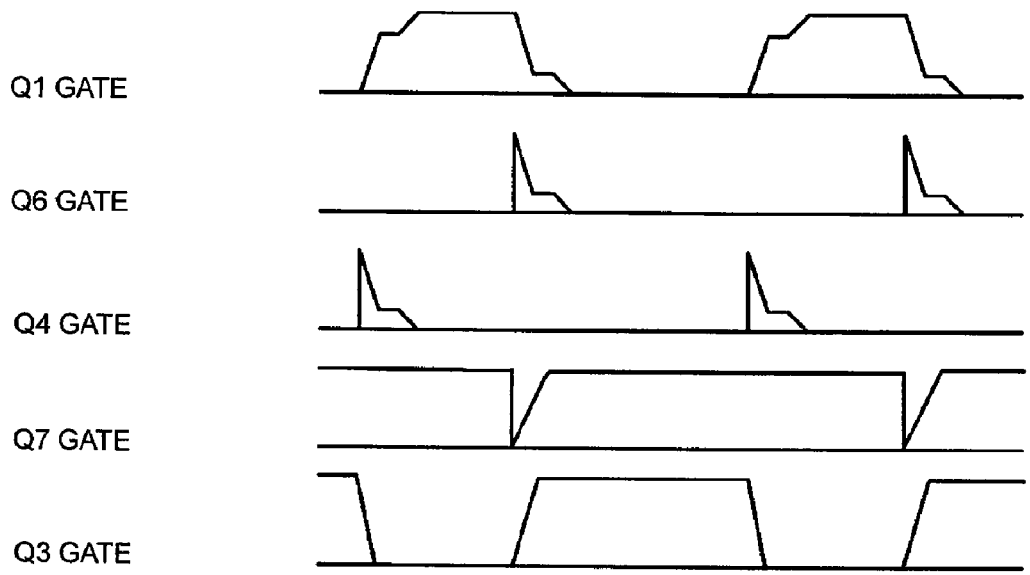
FIG. 8 illustrates waveforms of a main part of the converter.

FIG. 7 is a circuit diagram of the synchronous rectifying forward converter according to the third embodiment, and FIG. 8 is a waveform diagram of a main part thereof.

In the third embodiment, the gate of the rectifying switch element Q2 connects to one end of the secondary winding N12 of the main transformer T1, and the rectifying switch element Q2 is controlled with the voltage of the transformer as in a known art. On the other hand, the output voltage of the control voltage signal generating circuit 26 is applied between the gate and source of the commutating switch element Q3 via the controlling switch element Q7. The controlling switch element Q6 is connected between the gate of the controlling switch element Q7 and the ground. Also, the commutating switch controlling switch element Q4 is connected between the gate and source (ground) of the commutating switch element Q3. An output of the drive control signal regenerating circuit 30 including the pulse transformer T3, the diode D4, and the resistor R1 is applied to the gate of the controlling switch element Q6, and an output of the drive control signal regenerating circuit 29 including the pulse transformer T2, the diode D3, and the resistor R4 is applied to the gate of the commutating switch controlling switch element Q4. In a normal state, the controlling switch element Q7 is in an OFF-state due to a current supplied via the resistor R5. Also, the commutating switch controlling switch element Q4 and the controlling switch element Q6 are in an OFF-state in the normal state. When the commutating switch element Q3 is in an OFF-state, if an OFF trigger pulse of the main switch element Q1 is transmitted via the pulse transformer T3, an OFF timing drive signal is output from the drive control signal regenerating circuit 30, the controlling switch element Q6 is turned ON, the controlling switch element Q7 is turned ON, and the commutating switch element Q3 is turned ON. Then, the controlling switch element Q6 is immediately turned OFF and the controlling switch element Q7 is immediately turned OFF. However, the commutating switch element Q3 is kept in an ON-state due to the charge between the gate and source thereof.

Then, if an ON trigger pulse of the main switch element Q1 is transmitted via the pulse transformer T2, an ON timing drive signal is output from the drive control signal regenerating circuit 29, the commutating switch controlling switch element Q4 is turned ON, and the commutating switch element Q3 is turned OFF because the gate-to-source charge of the commutating switch element Q3 is discharged. Then, the commutating switch controlling switch element Q4 is immediately turned OFF. However, since the controlling switch element Q7 is OFF and there is no current supplying path to the gate of the commutating switch element Q3, the commutating switch element Q3 is kept in the OFF-state.

FIG. 8 illustrates waveforms of gate voltages of the switch elements Q1, Q6, Q4, Q7, and Q3 shown in FIG. 7. As shown in the figure, the switch elements Q6, Q7, and Q3 are turned ON at turn-OFF of the main switch element Q1. The switch element Q4 is turned ON and the switch element Q3 is turned OFF at turn-ON of the main switch element Q1. In this way, the commutating switch element Q3 is directly driven by control of the primary side.

As described above, the commutating switch element Q3 is forced to be turned OFF at turn-ON of the main switch element Q1, and is turned ON at turn-OFF of the main switch element Q1. Thus, the ON-period of the main transformer T1 does not change and the voltage of the tertiary winding N13 does not rise. Also, the choke coil L2 is excited at turn-ON of the commutating switch element Q3. However, the excitation is not reset at turn-ON of the rectifying switch element Q2, and thus biased magnetization occurs. Accordingly, flown back current can be absorbed, and a stable operation can be performed with a reverse current from the output being regenerated to the primary side (the output is the same as at substantially no load) until the choke coil L2 is saturated. The commutating switch element Q3 is forced to be turned OFF at the timing when it should be turned OFF (ON timing of the main switch element Q1), and thus self-excited oscillation does not occur.

Fourth Embodiment

Hereinafter, a configuration of a synchronous rectifying forward converter according to a fourth embodiment is described with reference to FIG. 9.

In the synchronous rectifying forward converter according to the fourth embodiment, both the rectifying switch element Q2 and the commutating switch element Q3 are directly driven from the primary side. Drive of the rectifying switch element Q2 is the same as illustrated in FIG. 4. An inverter 31, serving as a commutating switch element control circuit, to invert the logic level of high/low of the gate voltage of the rectifying switch element Q2 is connected between the gates of the rectifying switch element Q2 and the commutating switch element Q3. That is, the rectifying switch element Q2 is turned ON/OFF in synchronization with ON/OFF of the main switch element Q1, and the commutating switch element Q3 is turned OFF/ON. At that time, the commutating switch element Q3 is turned ON after the rectifying switch element Q2 is turned OFF and delay time of the inverter 31 has passed. Accordingly, simultaneous turn-ON of the switching elements Q2 and Q3 can be prevented.

Fifth Embodiment

Hereinafter, a configuration of a synchronous rectifying forward converter according to a fifth embodiment is described with reference to FIG. 10.

Figure 10:
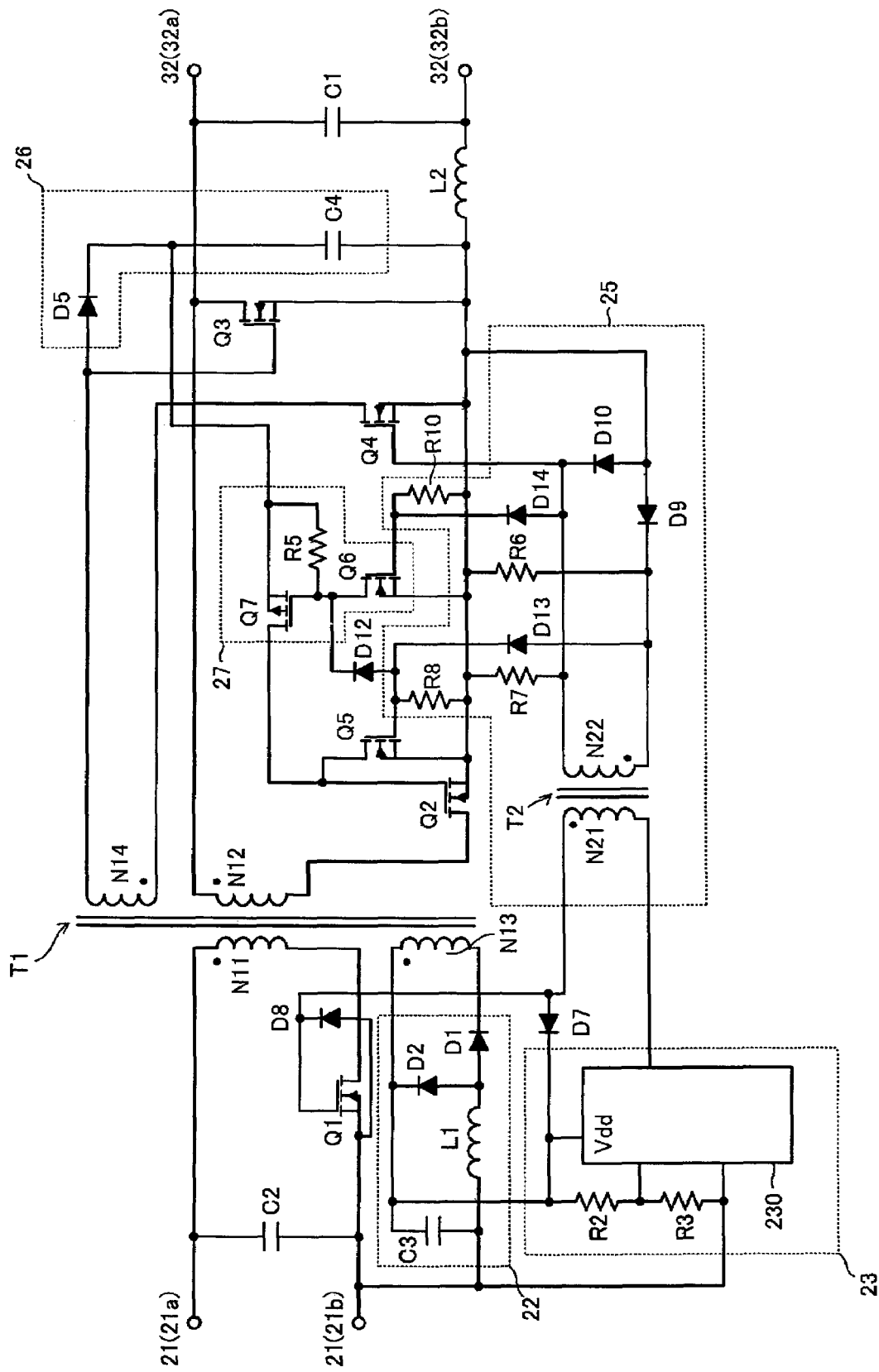
FIG. 10 is a circuit diagram of a synchronous rectifying forward converter according to a fifth embodiment.

FIG. 10 is a circuit diagram thereof. In the circuit shown in FIG. 4, an ON trigger pulse and an OFF trigger pulse of the main switch element Q1 are transmitted by using the two pulse transformers T2 and T3. On the other hand, in the synchronous rectifying forward converter shown in FIG. 10, an ON trigger pulse and an OFF trigger pulse of the main switch element Q1 are transmitted to the secondary side by using only the pulse transformer T2.

The secondary winding N22 of the pulse transformer T2 is provided with a diode bridge including diodes D9 and D10. The pulse transformer T2 and the diodes D9 and D10 form a drive control signal regenerating circuit 25. The drive control signal regenerating circuit 25 has the functions of both the drive control signal regenerating circuits 29 and 30. That is, the resetting diode on the primary side of the pulse transformer T2 is not provided, and diodes D7 and D8 for clamp are provided. Also, the diode bridge including the diodes D9 and D10 is provided on the secondary side of the pulse transformer T2. The diodes D7 and D8 reset excitation that occurs at ON/OFF of the pulse transformer T2.

A node between one end of the secondary winding N22 of the pulse transformer T2 and the cathode of the diode D9 connects to the gate of the rectifying switch controlling switch element Q5 via a diode D13 for preventing backflow. A resistor R8 is connected between the gate of the rectifying switch controlling switch element Q5 and the ground, and a resistor R7 is connected between the other end of the secondary winding N22 of the pulse transformer T2 and the ground. The two resistors R7 and R8 are used to adjust the voltage that is generated in the secondary winding N22 of the pulse transformer T2 when an OFF trigger pulse of the main switch element Q1 is generated.

A node between the one end of the secondary winding N22 of the pulse transformer T2 and the cathode of the diode D10 connects to the gate of the controlling switch element Q6 via a diode D14 for preventing backflow. A resistor R10 is connected between the gate of the controlling switch element Q6 and the ground, and a resistor R6 is connected between the other end of the secondary winding N22 of the pulse transformer T2 and the ground. The two resistors R6 and R10 are used to adjust the voltage that is generated in the secondary winding N22 of the pulse transformer T2 when an ON trigger pulse of the main switch element Q1 is generated.

A diode D12 is connected between the drain of the controlling switch element Q6 and the gate of the rectifying switch controlling switch element Q5. The diode D12 reliably allows the rectifying switch controlling switch element Q5 to be turned OFF at turn-ON of the controlling switch element Q6, so that an increase in loss of the rectifying switch controlling switch element Q5 caused by simultaneous ON of the switch elements Q7 and Q5 can be prevented.

Other than that, the configuration is the same as that shown in FIG. 4.

In this way, ON timing and OFF timing of the main switch element Q1 are transmitted to the secondary side by using the single pulse transformer T2 and are divided on the secondary side in order to regenerate a drive signal of the rectifying switch element Q2. Accordingly, the number of components can be reduced.

Sixth Embodiment

Hereinafter, a configuration of a synchronous rectifying forward converter according to a sixth embodiment is described with reference to FIG. 11.

Figure 11:
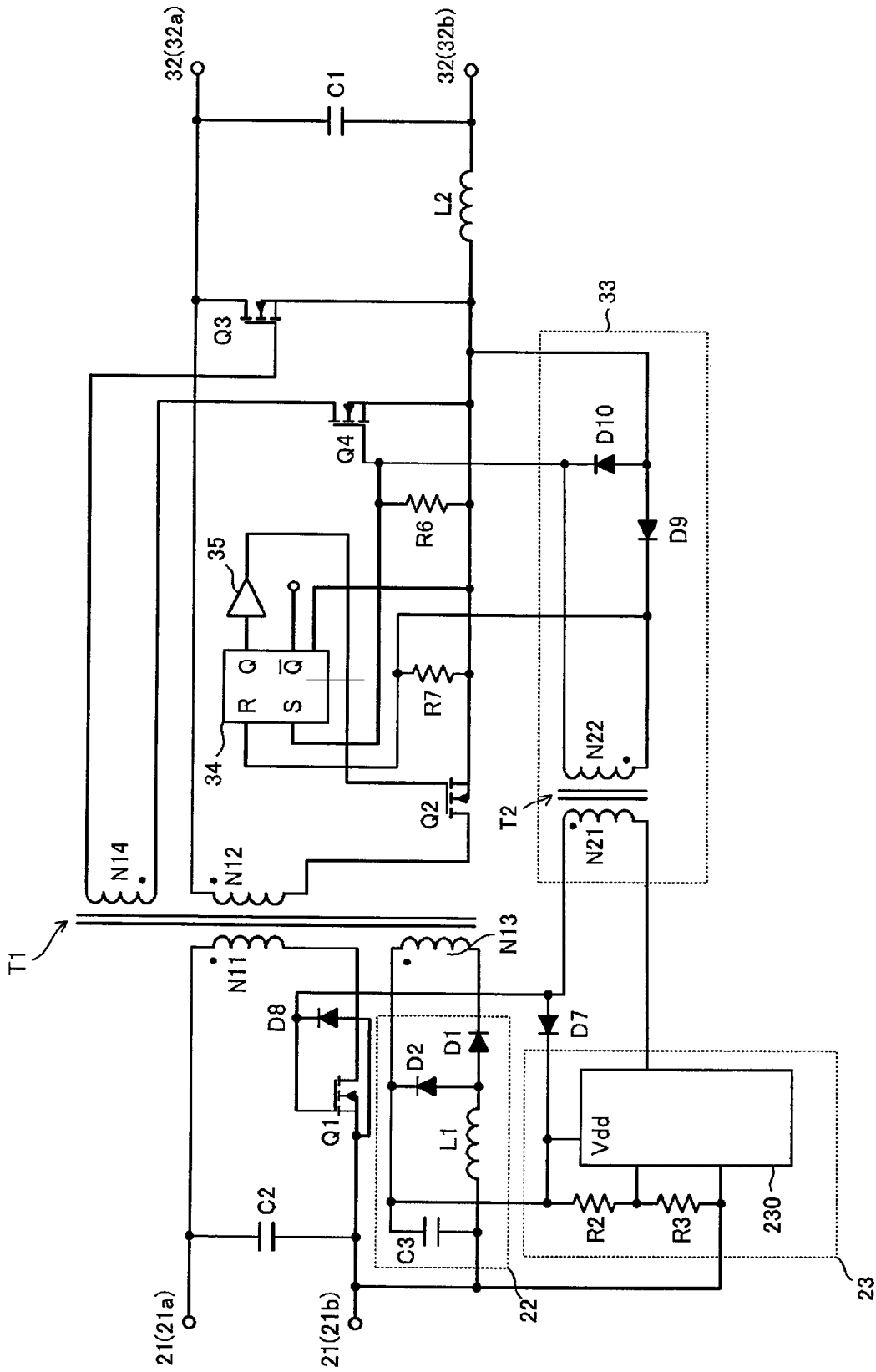
FIG. 11 is a circuit diagram of a synchronous rectifying forward converter according to a sixth embodiment.

In the synchronous rectifying forward converter shown in FIG. 11, the rectifying switch element Q2 is controlled on the basis of a signal from a drive control signal regenerating circuit 33 by using a flip-flop (RS flip-flop IC) 34.

The secondary winding N22 of the pulse transformer T2 is provided with the diode bridge including the diodes D9 and D10. The pulse transformer T2 and the diodes D9 and D10 form the drive control signal regenerating circuit 33. No resetting diode is provided on the primary side of the pulse transformer T2, but the diodes D7 and D8 for clamp are provided. The diodes D7 and D8 reset excitation that occurs at ON/OFF of the pulse transformer T2. An output signal from the cathode of the diode D10 is input to the gate of the commutating switch controlling switch element Q4. Accordingly, the commutating switch controlling switch element Q4 is turned ON at ON timing of the main switch element Q1 and the gate-to-source charge of the commutating switch element Q3 is discharged, so that the commutating switch element Q3 is turned OFF. The control of the commutating switch element Q3 is the same as in the known art.

Also, connection is made so that a signal applied to the gate of the commutating switch controlling switch element Q4 is input to a set input terminal S of the flip-flop 34 and that an output signal from the cathode of the diode D9 is input to a reset input terminal R of the flip-flop 34. Also, a Q output signal of the flip-flop 34 is applied as a drive signal to the gate of the rectifying switch element Q2 via a driver 35. Thus, the flip-flop 34 is set and the rectifying switch element Q2 is turned ON at turn-ON of the main switch element Q1. At turn-OFF of the main switch element Q1, the flip-flop 34 is reset and the rectifying switching element Q2 is forced to be turned OFF.

An output of the converter or change in voltage of the transformer can be used as a power supply for the flip-flop 34. In that case, the flip-flop 34 does not operate because no voltage is generated at start up. However, no problem occurs in terms of operation because each of the rectifying switch element Q2 and the commutating switch element Q3 is a MOSFET, which performs diode rectification by using a body diode included therein. The flip-flop 34 operates and performs the above-described operation at a stage where an output voltage of the converter is generated.

Seventh Embodiment

Hereinafter, a configuration of a synchronous rectifying forward converter according to a seventh embodiment is described with reference to FIG. 12.

Figure 12:
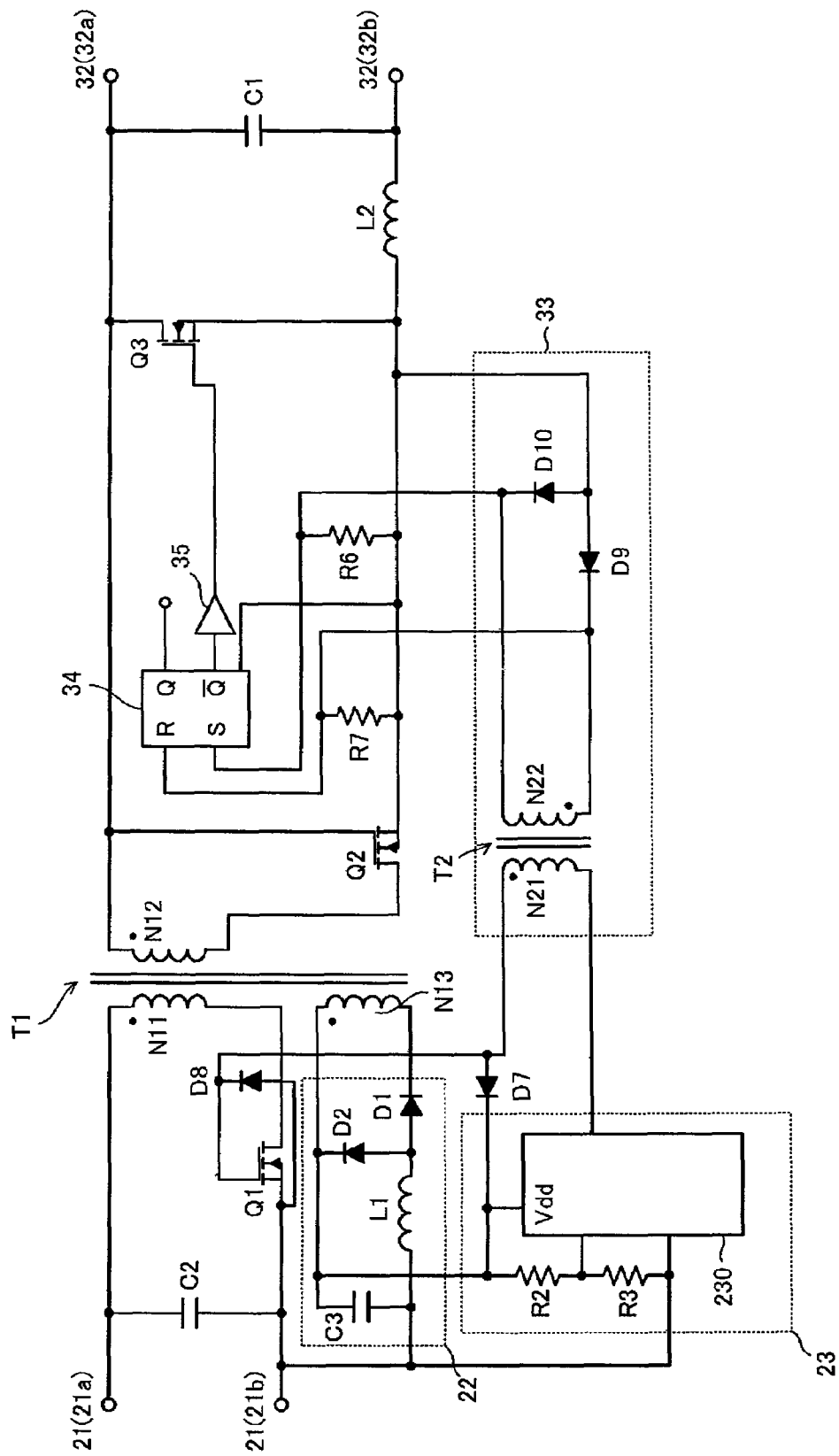
FIG. 12 is a circuit diagram of a synchronous rectifying forward converter according to a seventh embodiment.

FIG. 12 is a circuit diagram of the synchronous rectifying forward converter according to the seventh embodiment. In this embodiment, the configuration is made so that a /Q output signal (inverted output signal of Q) of the flip-flop 34 is applied to the gate of the commutating switch element Q3 via the driver 35. Signals are supplied to the gate of the rectifying switch element Q2 from one end of the secondary winding N12 of the main transformer T1. That is, the rectifying switch element Q2 is winding-driven and the commutating switch element Q3 is directly driven from the primary side. The signal output from the cathode side of the diode D9 at turn-OFF of the main switch element Q1 allows the flip-flop 34 to be reset and the commutating switch element Q3 to be turned ON. At turn-ON of the main switch element Q1, the signal output from the cathode side of the diode D10 allows the flip-flop 34 to be set and the commutating switch element Q3 to be forcefully turned OFF.

The operation and effect of the synchronous rectifying forward converter shown in FIG. 12 are the same as those of the forward converter shown in FIG. 7. Since the flip-flop 34 can be integrated, the number of components can be reduced.

Eighth Embodiment

Hereinafter, a configuration of a synchronous rectifying forward converter according to an eighth embodiment is described with reference to FIG. 13.

Figure 13:
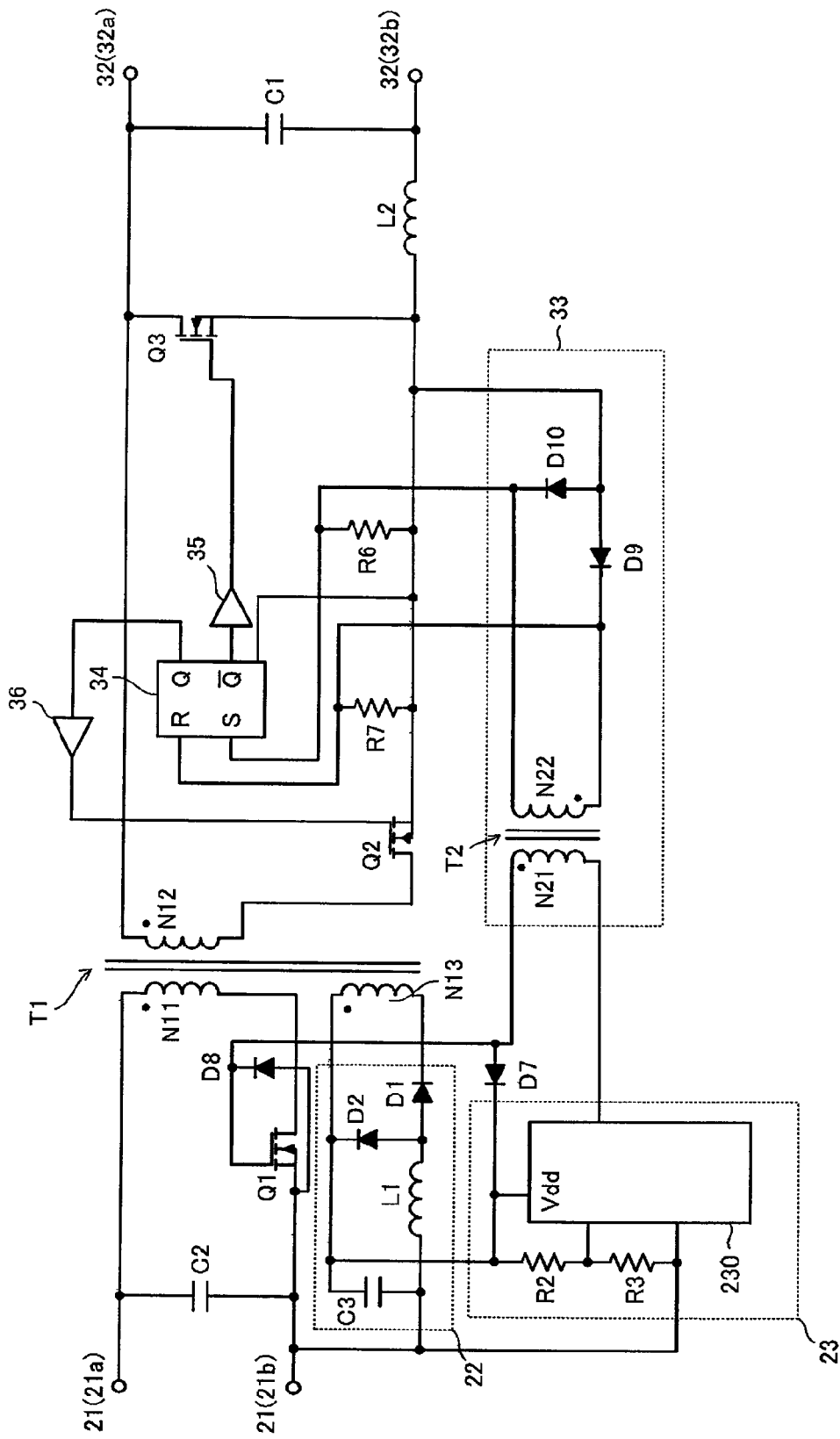
FIG. 13 is a circuit diagram of a synchronous rectifying forward converter according to an eighth embodiment.

FIG. 13 is a circuit diagram of the synchronous rectifying forward converter according to the eighth embodiment. In this embodiment, the configuration is made so that a Q output of the flip-flop 34 is applied to the gate of the rectifying switch element Q2 via a driver 36 and that a /Q output (inverted output signal of Q) of the flip-flop 34 is applied to the gate of the commutating switch element Q3 via the driver 35.

Figure 9:
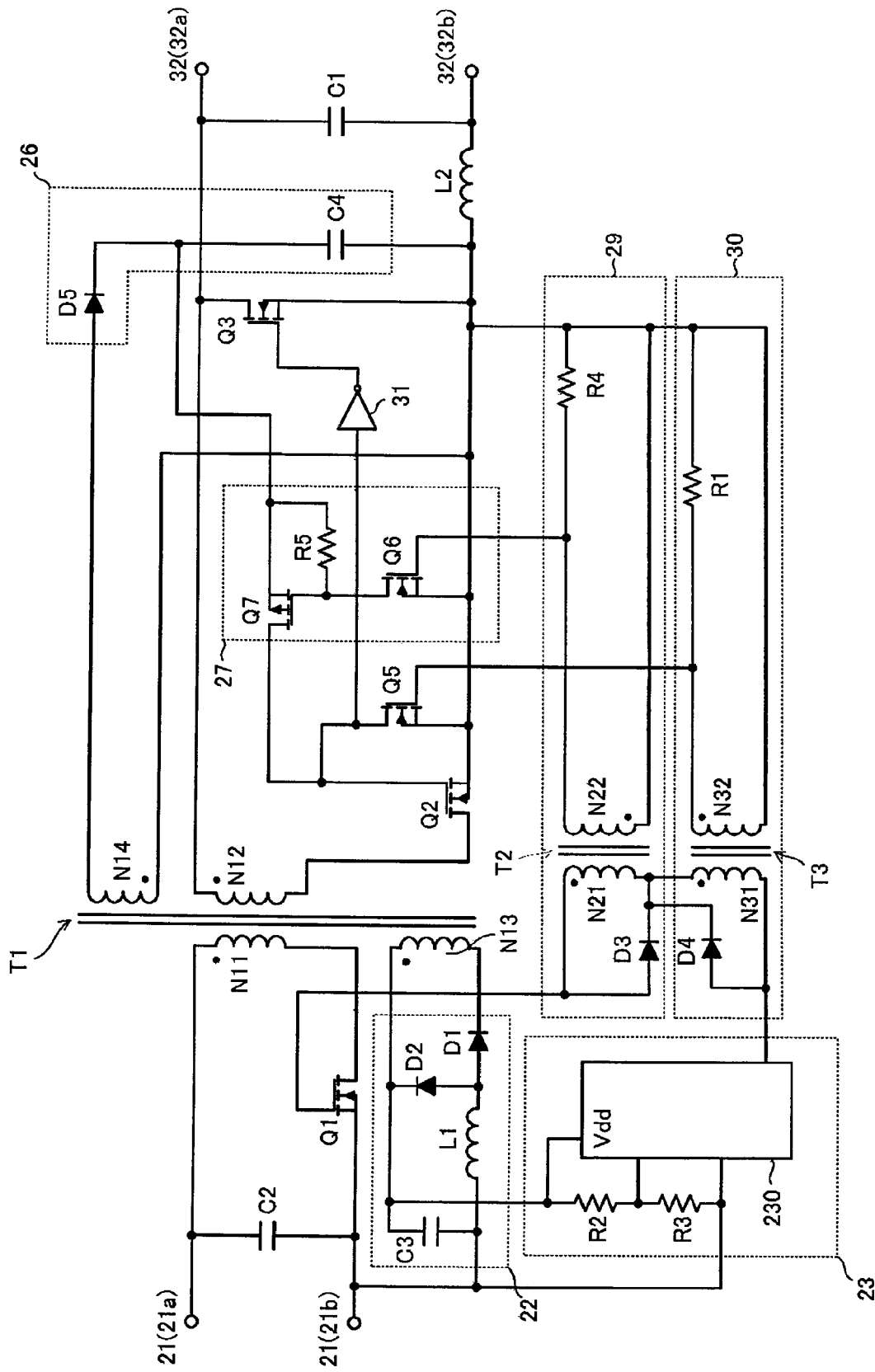
FIG. 9 is a circuit diagram of a synchronous rectifying forward converter according to a fourth embodiment.

In this way, both the rectifying switch element Q2 and the commutating switch element Q3 are directly driven from the primary side, so that the same operation and effect as those of the synchronous rectifying forward converter shown in FIG. 9 can be obtained. Furthermore, the number of components can be reduced by using the integrated flip-flop.

Ninth Embodiment

Hereinafter, a synchronous rectifying forward converter according to a ninth embodiment is described with reference to FIG. 14.

In the ninth embodiment, description is made about a method for supplying power to the flip-flop 34 and the drivers 35 and 36 of the synchronous rectifying forward converters according to the sixth to eighth embodiments.

Figure 14:
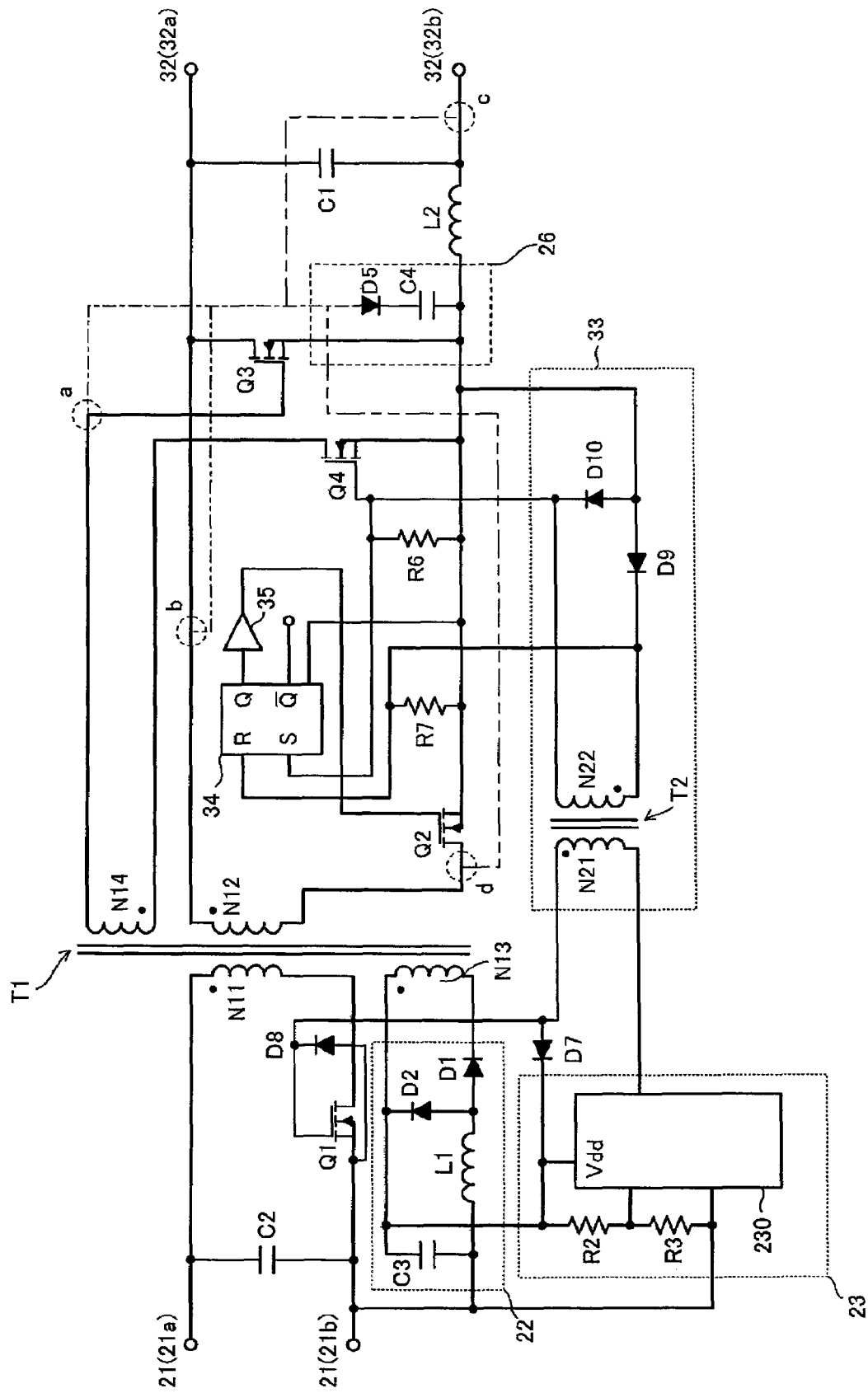
FIG. 14 is a circuit diagram of a synchronous rectifying forward converter according to a ninth embodiment.

In FIG. 14, the control voltage signal generating circuit 26 includes the diode D5 to rectify a voltage signal and the capacitor C4 to charge the rectifying voltage therefor. In FIG. 14, the voltage of the capacitor C4 is applied as power to the flip-flop 34 and the driver 35. As a voltage source to the control voltage signal generating circuit 26, point "a" shown in FIG. 14 may be used. Alternatively, any of points "b", "c", and "d" may be used. The voltage charged in the control voltage signal generating circuit 26 may be raised or dropped by a regulator.

Also, a circuit for diode-rectifying an output of the secondary winding N12 or another winding of the main transformer T1 may be provided.

Furthermore, power may be supplied from another power supply circuit connected to the secondary side.

Although the present invention has been described in relation to particular embodiments thereof, many other variations and modifications and other uses will become apparent to those skilled in the art. Therefore, the present invention is not limited by the specific disclosure herein.

What is claimed is:

1. A synchronous rectifying forward converter comprising:
   a transformer including a primary winding, a secondary winding, and a tertiary winding;
   a main switch element connected in series to the primary winding of the transformer;
   a choke coil connected in series to the secondary winding of the transformer;
   a smoothing capacitor connected in parallel between output terminals;
   a rectifying switch element that is connected in series to the secondary winding of the transformer and that is turned ON/OFF in synchronization with turning ON/OFF of the main switch element;
   a commutating switch element that is turned OFF/ON in synchronization with turning ON/OFF of the main switch element and that forms a path to emit excitation energy of the choke coil by being turned ON; and a switching control circuit to apply a drive signal to the main switch element, further comprising a synchronous rectifier element driving circuit that transmits only ON timing and OFF timing as trigger pulses in the drive signal of the main switch element output from the switching control circuit from the primary side to the secondary side via pulse transformers, and that regenerates a drive signal to drive at least one of the rectifying switch element and the commutating switch element in accordance with turning ON/OFF of the main switch element on the basis of the trigger pulses;

a pulse separation circuit for separating the ON-timing trigger pulse and the OFF-timing trigger pulse output from the pulse transformers, and the polarity of the ON timing pulse and the OFF timing pulse being the same.

2. A synchronous rectifying forward converter comprising:

a transformer including a primary winding, a secondary winding, and a tertiary winding;

a main switch element connected in series to the primary winding of the transformer;

a choke coil connected in series to the secondary winding of the transformer;

a smoothing capacitor connected in parallel between output terminals;

a rectifying switch element that is connected in series to the secondary winding of the transformer and that is turned ON/OFF in synchronization with turning ON/OFF of the main switch element;

a commutating switch element that is turned OFF/ON in synchronization with turning ON/OFF of the main switch element and that forms a path to emit excitation energy of the choke coil by being turned ON; and a switching control circuit to apply a drive signal to the main switch element, further comprising a synchronous rectifier element driving circuit that transmits only ON timing and OFF timing as trigger pulses in the drive signal of the main switch element output from the switching control circuit from the primary side to the secondary side via pulse transformers, and that regenerates a drive signal to drive at least one of the rectifying switch element and the commutating switch element in accordance with turning ON/OFF of the main switch element on the basis of the trigger pulses;

wherein the synchronous rectifier element driving circuit comprises:

a control voltage signal generating circuit to generate a control voltage for the rectifying switch element;

a rectifying switch ON controlling switch circuit to apply the control voltage generated by the control voltage signal generating circuit to the rectifying switch element at turn-ON of the main switch element; and a rectifying switch controlling switch element to forcefully turn OFF the rectifying switch element by controlling the voltage of a control terminal of the rectifying switch element at turn-OFF of the main switch element.

3. The synchronous rectifying forward converter according to claim 2 provided with a commutating switch element control circuit to turn OFF/ON the commutating switch element by controlling the voltage of the control terminal of the commutating switch element on the basis of an ON/OFF control signal of the rectifying switch element.

4. A synchronous rectifying forward converter comprising:

a transformer including a primary winding, a secondary winding, and a tertiary winding;

a main switch element connected in series to the primary winding of the transformer;

a choke coil connected in series to the secondary winding of the transformer;

a smoothing capacitor connected in parallel between output terminals;

a rectifying switch element that is connected in series to the secondary winding of the transformer and that is turned ON/OFF in synchronization with turning ON/OFF of the main switch element;

a commutating switch element that is turned OFF/ON in synchronization with turning ON/OFF of the main switch element and that forms a path to emit excitation energy of the choke coil by being turned ON; and a switching control circuit to apply a drive signal to the main switch element, further comprising a synchronous rectifier element driving circuit that transmits only ON timing and OFF timing as trigger pulses in the drive signal of the main switch element output from the switching control circuit from the primary side to the secondary side via pulse transformers, and that regenerates a drive signal to drive at least one of the rectifying switch element and the commutating switch element in accordance with turning ON/OFF of the main switch element on the basis of the trigger pulses;

wherein the synchronous rectifier element driving circuit comprises:

a control voltage signal generating circuit to generate a control voltage for the commutating switch element;

a commutating switch ON controlling switch circuit to apply the control voltage generated by the control voltage signal generating circuit to the commutating switch element at turn-OFF of the main switch element; and a commutating switch controlling switch element to forcefully turn OFF the commutating switch element by controlling the voltage of a control terminal of the commutating switch element at turn-ON of the main switch element.

5. The forward converter according to any one of claims 1 to 4, wherein the pulse transformers include a first pulse transformer to transmit ON timing as a trigger pulse in the drive signal of the main switch element output from the switching control circuit from the primary side to the secondary side; and a second pulse transformer to transmit OFF timing as a trigger pulse in the drive signal of the main switch element output from the switching control circuit from the primary side to the secondary side.

6. The synchronous rectifying forward converter according to any one of claims 1 to 4, wherein a diode bridge to output an ON timing signal and an OFF timing signal of the main switch element is provided on the secondary side of one of the pulse transformers of the synchronous rectifier element driving circuit.

7. The synchronous rectifying forward converter according to any one of claims 1 to 4, wherein the synchronous rectifier element driving circuit includes a flip-flop of which state is switched at turning ON and OFF of the main switch element, the flip-flop controlling the rectifying switch element or the commutating switch element by using the state signal.

8. The synchronous rectifying forward converter according to claim 5, wherein the synchronous rectifier element driving circuit includes a flip-flop of which state is switched at turning ON and OFF of the main switch element, the flip-flop controlling the rectifying switch element or the commutating switch element by using the state signal.

9. The synchronous rectifying forward converter according to claim 6, wherein the synchronous rectifier element driving circuit includes a flip-flop of which state is switched at turning ON and OFF of the main switch element, the flip-flop controlling the rectifying switch element or the commutating switch element by using the state signal.

* * * * *